Figure 1:
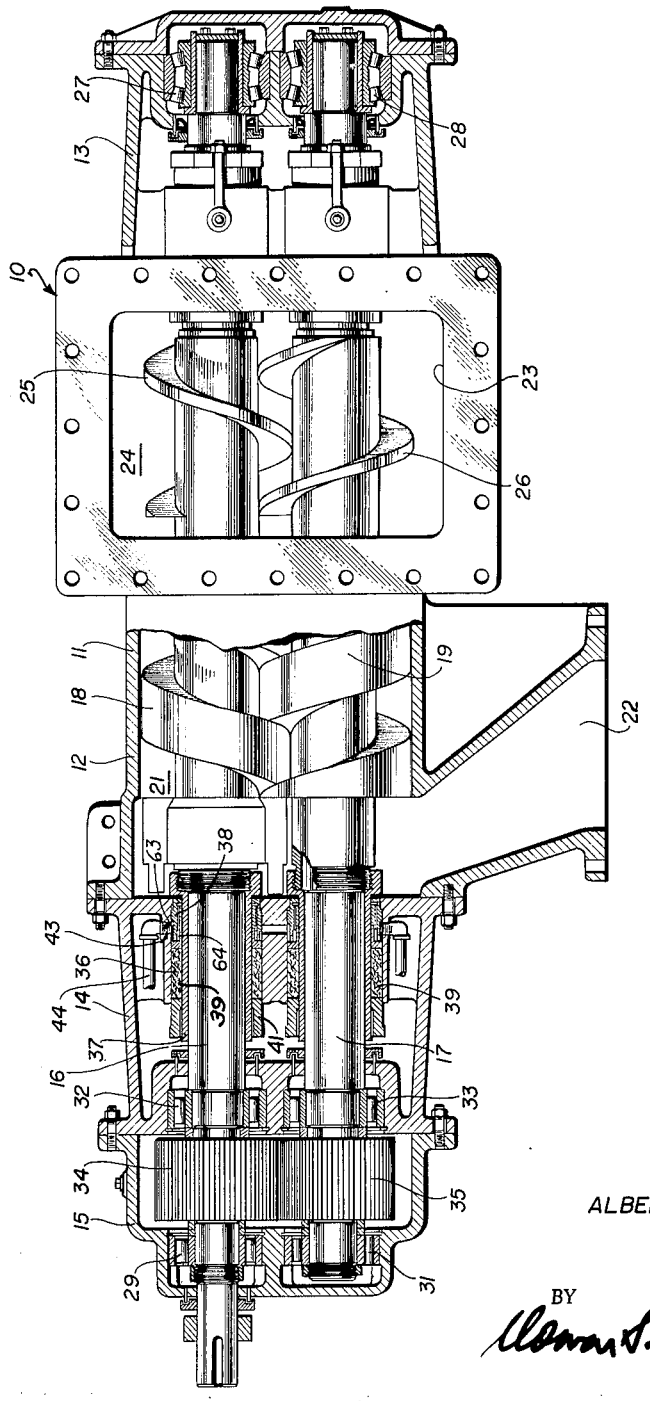

Aug. 3, 1965   A. A. ZALIS   3,198,132
PUMP
Filed Jan. 17, 1964   2 Sheets-Sheet 1

ALBERT A. ZALIS
INVENTOR.

BY

ALBERT A. ZALIS
INVENTOR.

United States Patent Office 3,198,132
Patented Aug. 3, 1965

3,198,132
PUMP
Albert A. Zalis, Warren, Mass., assignor to Warren Pumps, Incorporated, Warren, Mass., a corporation of Massachusetts
Filed Jan. 17, 1964, Ser. No. 338,512
10 Claims. (Cl. 103—204)

This invention relates to a pump and, more particularly, to apparatus arranged to provide a pressure and flow differential in a fluid system.

In the construction of rotary pumps considerable difficulty has always been experienced in the area where the pump shaft leaves the housing. In this area it is quite often necessary not only to support the shaft against radial loads but also to prevent leakage of the fluid being pumped. For this purpose, it has been common practice to provide a packing which usually consists of a quantity of soft absorbent material which can be compressed to form a seal and to provide a bushing to absorb the radial loads on the shaft. In addition, it has been common practice to provide a so-called "lantern ring" to provide fluid to the seal to increase its ability to perform the sealing function. Not only does this combination of elements present a rather complicated design, manufacturing, and installation problem, but in those cases where dense and abrasive materials are pumped, the elements wear out rather rapidly and must be replaced. Furthermore, in all bearing applications, frictional heat is a problem and different temperatures of shaft and bearings in this area during different types of pumping loads can cause different degrees of sealing, so that the fluid being pumped may leak around the shaft at one load, whereas the seal will be more or less effective at another load. These and other difficulties experienced with the prior art devices have been obviated in a novel manner by the present invention.

It is, therefore, an outstanding object of the invention to provide a pump having a unitized seal, bearing, and lantern ring.

Another object of this invention is the provision of a pump having a bearing bushing which will not be rendered inoperative due to the introduction of abrasive materials.

A further object of the present invention is the provision of a pump having a bushing incorporating cooling means to eliminate variation of sealing effectiveness at various loads of pump operation.

It is another object of the instant invention to provide a pump incorporating a sealing and load-bearing element which is simple in construction, which is inexpensive to manufacture, and which is capable of a long life of useful service with a minimum of maintenance.

It is a further object of the invention to provide a pump having a shaft bushing incorporating the dual functions of maintaining constant temperature irrespective of load and of flushing abrasive materials from the surface of the bushing.

With these and other objects in view, as will be apparent to those skilled in the art, the invention resides in the combination of parts set forth in the specification and covered by the claims appended hereto.

Figure 2:
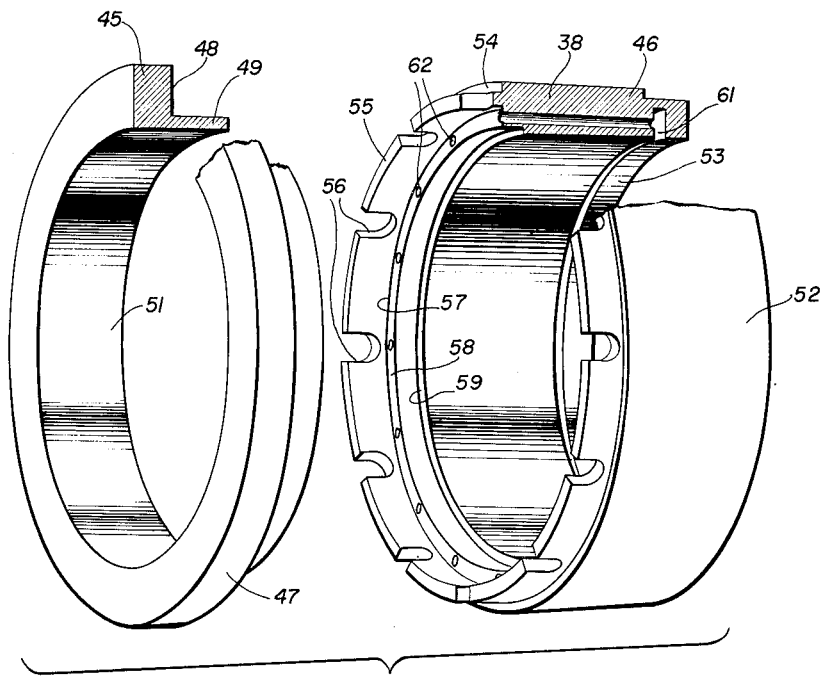

The character of the invention, however, may be best understood by reference to one of its structural forms as illustrated by the accompanying drawings in which:

FIG. 1 is a longitudinal sectional view of a pump incorporating the principles of the present invention, and FIG. 2 is an exploded view of a bushing incorporated in the pump.

Referring first to FIG. 1, wherein are best shown the general features of the invention, the pump, indicated generally by the reference numeral 10, is shown as provided with a housing 11 having a main portion 12, a bearing box 13 fastened to one end of the main portion, an extension 14 fastened to the other end of the main portion 12, and a gear box 15 fastened to the outboard end of the extension. Extending through the housing 11 are two shafts 16 and 17 carrying, respectively, screw-type pumping elements 18 and 19 which lie in a main pumping chamber 21 formed in the main portion 12 of the housing and having at one end the pump outlet 22. At the other end of the main portion 12 of the housing is a pump inlet 23 which opens into an inlet chamber 24. The shafts 16 and 17 are provided, respectively, with feed screws 25 and 26 which lie in the chamber 24. The bearing box 13 carries a tapered roller bearing 27 in which resides one end of the shaft 16, while it also carries a tapered roller bearing 28 which carries the corresponding end of the shaft 17.

The gear box 15 carries a roller bearing 29 which carries the other end of the shaft 16 which, incidentally, extends outwardly of the gear box for attachment to a drive motor or the like. The shaft 17 is provided with a roller bearing 31 in which the other end of the shaft 17 is carried. The extension 14 carries two roller bearings 32 and 33 in which are mounted, respectively, the shafts 16 and 17. On the shaft 16 and between the bearing 29 and the bearing 32 is mounted a gear 34, while a similar gear 35 is mounted on the shaft 17 between the bearings 31 and 33 and meshes with the gear 34.

The extension 14 of the housing 11 is provided with a bore 36 through which the shaft 16 extends. The shaft at this point is provided with a sleeve 37 which is firmly attached to the shaft and forms a part thereof. Between the outer surface of the sleeve 37 and the inner surface of the bore 36 resides a bushing 38, a packing 39, and a packing pressure member 41. Through the wall of the extension 14 extends a passage 43 which extends through the wall into the bore 36 and which is provided at its outer end with a conduit 44 leading to a source (not shown) of a suitable fluid, such as water.

Referring now to FIG. 2, which shows the details of the bushing 38, it can be seen that the bushing is formed in two portions consisting of a first part 45 and a second part 46. The first part 45 is generally annular and has an outer cylindrical surface 47 which is approximately the same diameter as the bore 36. Extending inwardly from this surface is a radial surface 48 which faces toward the second portion 46 and which terminates at its inner part in an axially-extending flange 49. The first part is also provided with an inner cylindrical surface 51 adapted to fit smoothly on the outer surface of the sleeve 37 of the shaft 16.

The second part 46 of the bushing is of generally elongated tubular form and is provided with an outer cylindrical surface 52 which has the same diameter as the outer cylindrical surface 47 of the first part 45 and with an inner cylindrical surface 53 which has the same diameter as the inner cylindrical surface 51 of the first part 45. The second part 46 is provided with a rabbet 54 at the end which lies adjacent the first part 45 and defines an axially-extending flange 55 which is provided with a series of slots or notches 56. Inwardly of the flange 55 the second member 46 is provided with a deep rabbet 57 defined by the inner cylindrical surface of the flange 55 and by a radially-extending surface 58. Finally, inwardly of the rabbet 57 and of the surface 58 the second member is provided with a rabbet 59 in which the flange 49 of the first part 45 exactly and tightly fits.

Formed on the inner cylindrical surface 53 of the second part of the bushing is a deep flushing groove 61 which extends entirely around the circumference adjacent the end opposite the rabbet 54. Finally, the second part of the bushing is provided with a series of axially-extending bores or passages 62 which enter the radially-extending surface 58 and extend axially until they terminate in the flushing groove 61 at the other end of the bushing. When the first part 45 and the second part 46 are assembled to make up the complete bushing 38, the rabbet 54 and the outermost portion of the radially-extending surface 48 define a fluid-receiving groove, indicated by the reference numeral 63 in FIG. 1. The flange 49 during this assembly fits tightly into the rabbet 59 so that the flange 55 and the flange 49 form a chamber. This chamber is defined by the outer cylindrical surface of the flange 49, the inner cylindrical surface of the flange 55, the radial surface 48 and the radially-extending surface 58, these surfaces forming an annular chamber which is indicated by the reference numeral 64 in FIG. 1. Both the first part and the second part are formed of an artificial elastomer plastic of the polymer type which, in the preferred embodiment, is nylon.

The operation of the invention will now be readily understood in view of the above description. During the operation of the pump, the shaft 16 is rotated by an external motor and the material being pumped enters the pump through the pump inlet 23, is fed axially along the shafts 16 and 17 by the feed screws 25 and 26, and is acted upon by the pumping elements 18 and 19, so that they leave the outlet 22 of the pump at a substantially higher pressure than the entrance pressure. During rotation and pump operation, the shafts 16 and 17 are subjected to intensive radial loads which are mainly absorbed by the main bearings 27, 28, 29, 31, 32, and 33. However, the bushing 38 is required to carry a substantial portion of the load due to bending of the shafts and, because of this deflection or bending of the shafts under load, a substantial sealing problem is presented. During pump operation, the bushing 38 is provided with a pressure fluid, such as water, through the conduit 44. It will be understood, of course, that the shaft 17 is provided with similar bushing and sealing elements. The fluid which is introduced through the conduit 44 should be of a nature to be entirely compatible with the material being pumped. If the material being pumped is water miscible, then water would be the fluid used. The fluid enters the housing through the passage 43 from the conduit 44 and enters the fluid-receiving groove 63 in the bushing 38. It flows radially inwardly through the wall formed by the flange 55 through the notches 56. The relative sizes of the first and second parts of the bushing are such that the outer edge or end of the flange 55 is pressed tightly against the radial surface 48. The fluid enters the annular chamber 64 and then flows axially through the passages 62 into the flushing groove 61. Fluid leaves the innermost opening of the groove 61 and flows along the inner cylindrical surface 53 toward the chamber 21 of the pump. The slight annular passage between the surface 53 of the bushing and the outer surface of the sleeve 37 of the shaft 16 provides an annular passage for the flow of the fluid and the fluid eventually leaves the end of the bushing and enters the chamber 21 of the pump where it mixes with the material being pumped. It can be seen, then, that this constant flow of flushing fluid in the axial direction will prevent the entrance of pumped material into the bushing. The high density materials which are being pumped are quite abrasive; this flushing function prevents the wearing of the bushing surfaces (particularly the surfaces 51 and 53) by the abrasive material. At the same time, the presence of the fluid in the annular chamber 64 and in the passages 62 assures that the bushing will be cooled substantially during operation. By cooling in this manner, the relative temperature of the bushing at various pumping loads will be very much the same, so that expansion and contraction and differences in viscosity in sealing fluids and the like will not produce substantial leakage at one load when the seals and sealing apparatus have been adjusted for another load.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pump, comprising
  (a) a housing having an internal chamber and a bore extending from the chamber to the exterior of the housing,
  (b) a shaft residing in the bore and having pumping elements which reside in the chamber,
  (c) a bushing residing in the bore and extending between the bore and the shaft, the bushing having a cooling passage therethrough terminating at one end in a flushing groove which lies against the surface of the shaft, and
  (d) means supplying a cooling and flushing fluid to the other end of the passage, the bushing being generally in the form of a tube having concentric cylindrical inner and outer surfaces, a fluid-receiving groove being formed on the outer surface adjacent one end thereof, the flushing groove being formed on the inner surface adjacent the other end, and the cooling passage extending axially through the bushing from the fluid-receiving groove to the flushing groove.

2. A pump as recited in claim 1, wherein an annular chamber is formed in the bushing radially inwardly of the fluid-receiving groove and is operatively connected to it by radial passages.

3. A pump as recited in claim 2, wherein a plurality of cooling passages extend axially through the bushing from the said annular chamber to the flushing groove.

4. A pump as recited in claim 3, wherein the bushing is formed as first and second separate parts, the first part having a tubular flange which fits tightly into a rabbet formed on the inner surface at the said one end.

5. A pump as recited in claim 4, wherein the first part has a radial surface extending radially outwardly from the said flange and the second part has an axially-extending tubular flange whose outer edge presses against the said radial surface.

6. A pump as recited in claim 5, wherein the flange on the second part is provided with a plurality of apertures which act as passages connecting the fluid-receiving groove to the said annular chamber.

7. A pump as recited in claim 5, wherein the said annular chamber is defined by the inner surface of the flange of the second part, by the outer surface of the flange of the first part, and by the said radial surface of the first part.

8. A pump as recited in claim 1, wherein the bushing is formed of nylon.

9. A pump as recited in claim 1, wherein the fluid is supplied at substantial pressure so that it flows from the flushing groove axially along the surface of the shaft to the chamber.

10. A pump as recited in claim 1, wherein the fluid is compatible with the material being pumped.

References Cited by the Examiner

UNITED STATES PATENTS 2,708,126   5/55   McLachlan et al. _____ 103—111
2,961,847  11/60   Whitney et al. _____ 103—111

FOREIGN PATENTS 264,398   1/50   Switzerland.

LAURENCE V. EFNER, *Primary Examiner.*

ROBERT M. WALKER, *Examiner.*